United States Patent Office.

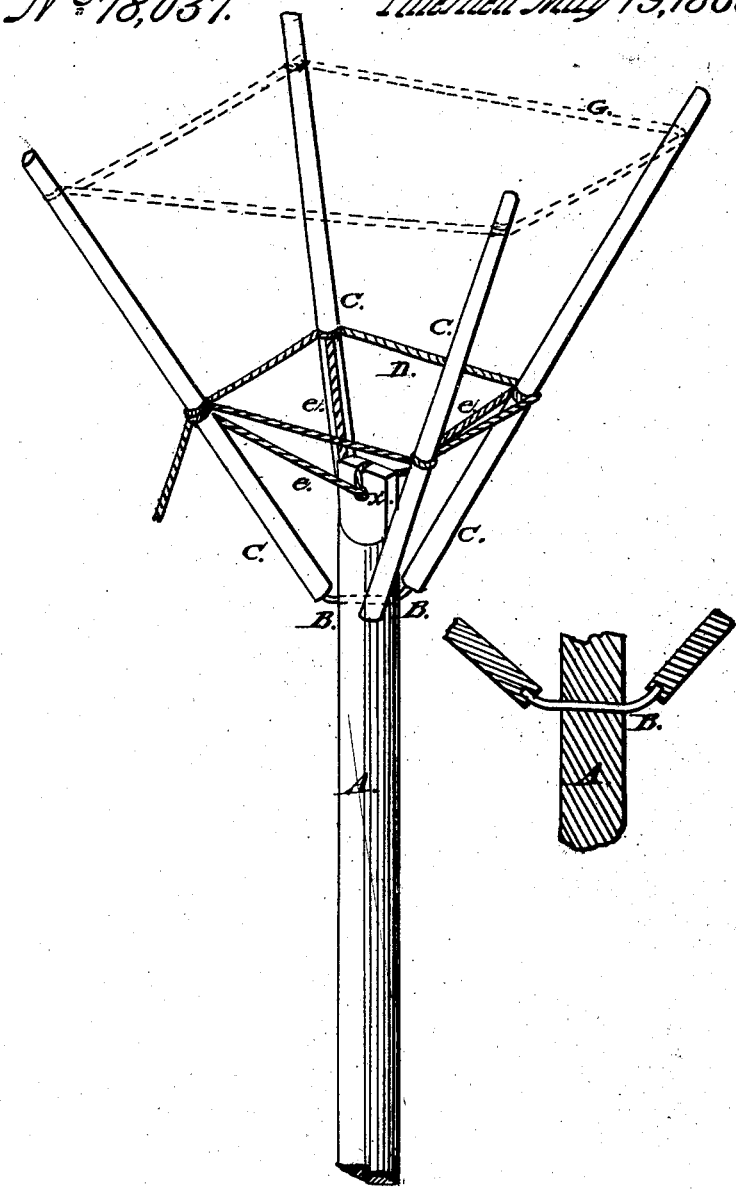

DAVID F. WILCOX, OF GREENVILLE, NEW YORK.

Letters Patent No. 78,037, dated May 19, 1868.

IMPROVEMENT IN HOP-POLES.

*The Schedule referred to in these Letters Patent and making part of the same.*

TO ALL WHOM IT MAY CONCERN:

Be it known that I, DAVID F. WILCOX, of Greenville, in the county of Greene, and in the State of New York, have invented certain new and useful Improvements in Hop-Poles; and do hereby declare that the following is a full, clear, and exact description thereof, reference being had to the accompanying drawings, and to the letters of reference marked thereon.

In the annexed drawings, making part of this specification, A represents a hop-pole, which is made less than the usual length, and which, as is customary, has its lower end firmly embedded in the earth, close to the hop-vine with which it is to be used.

Near the upper end of the pole A there are several holes bored through and at right angles to said pole, and metallic rods B B are inserted therein. The ends of these rods B project a little distance on each side of the pole, and are turned or bent upward, so that they form an angle of about forty-five degrees with that portion of the pole above them.

C C represents a series of supplementary poles or arms, which have holes bored into them from their lower ends, so that they may be secured upon the upturned ends of the rods B B.

A hole is bored through the upper end of the pole A, and a series of cords, e e, has one end secured in this hole, while their outer ends pass and are secured to the arms C C, for bracing and assisting in holding them in position.

D represents a cord, which passes from one arm to another, being secured to each, for also assisting in keeping them in position, as well as forming supports for the laterals from the hop-vines.

A cord, G, may be secured to the arms C, at their upper ends, if desired, for still further support for the vines.

By this arrangement, I form a very simple and cheap branching pole, for supporting and dividing the hop-vines, so that the hops will be more exposed to the rays of the sun, whereby they will be matured more readily, and, at the same time, better protected from disease and insects.

The arms C may, at any time, be removed from the rods B.

I am fully aware that the arrangement of three or more poles on the main upright by means of rings and nails is not new.

What I claim is—

The arrangement of the curved bars B B, passing through the pole A, arms C C C C, and cords D and e, all constructed and used substantially in the manner specified.

In testimony that I claim the foregoing, I have hereunto set my hand, this 22d day of April, 1868.

DAVID F. WILCOX.

Witnesses:
C. M. ALEXANDER,
J. M. MASON.